(12) United States Patent
Hurley et al.

(10) Patent No.: US 7,054,531 B2
(45) Date of Patent: May 30, 2006

(54) HIGH DENSITY FIBER OPTIC PREMISES CABLE WITH EASY OPEN UNITS

(75) Inventors: William C. Hurley, Hickory, NC (US); Martyn N. Easton, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 221 days.

(21) Appl. No.: 10/328,412

(22) Filed: Dec. 23, 2002

(65) Prior Publication Data

US 2004/0120665 A1 Jun. 24, 2004

(51) Int. Cl.
*G02B 6/44* (2006.01)

(52) U.S. Cl. .................. 385/106; 385/102; 385/103; 385/113

(58) Field of Classification Search ........ 385/100–114, 385/128
See application file for complete search history.

(56) References Cited

U.S. PATENT DOCUMENTS

| | | | |
|---|---|---|---|
| 4,317,000 A * | 2/1982 | Ferer | 174/70 R |
| 4,705,353 A | 11/1987 | Wagoner | 350/96.23 |
| 5,222,178 A * | 6/1993 | Betker et al. | 385/110 |
| 5,561,729 A * | 10/1996 | Parris | 385/113 |
| 5,703,984 A | 12/1997 | Carratt et al. | 385/106 |
| 5,751,880 A | 5/1998 | Gaillard | 385/109 |
| 5,857,051 A * | 1/1999 | Travieso et al. | 385/114 |
| 5,982,967 A * | 11/1999 | Mathis et al. | 385/102 |
| 6,041,153 A * | 3/2000 | Yang | 385/109 |
| 6,108,475 A * | 8/2000 | Chapin et al. | 385/128 |
| 6,122,424 A * | 9/2000 | Bringuier | 385/100 |
| 6,249,628 B1 | 6/2001 | Rutterman et al. | 385/106 |
| 6,370,303 B1 * | 4/2002 | Fitz et al. | 385/113 |
| 6,430,344 B1 * | 8/2002 | Dixon et al. | 385/109 |
| 6,442,316 B1 * | 8/2002 | Rossi et al. | 385/106 |
| 6,658,185 B1 * | 12/2003 | Bosisio et al. | 385/109 |
| 2001/0021296 A1 | 9/2001 | Nothofer | |
| 2002/0001440 A1 | 1/2002 | Bourget et al. | |
| 2004/0197059 A1 * | 10/2004 | Castellani et al. | 385/113 |

FOREIGN PATENT DOCUMENTS

| | | |
|---|---|---|
| DE | 29900108 U1 | 5/1999 |
| EP | 0833177 A1 | 4/1998 |
| EP | 1041420 A1 | 10/2000 |

* cited by examiner

*Primary Examiner*—Thien M. Le
*Assistant Examiner*—Edwyn Labaze (57) ABSTRACT

A unitized fiber optic cable 10 includes a plurality of unit cables 20, each of which also includes a plurality of tight buffered optical fibers 30. The unit cables 20 aid in segregating and identifying individual tight buffered optical fibers 30. Strength members, such as aramid fibers 14 can be located between the unit cables 20 and the outer cable jacket 12, instead of being located within the unit cables 20. Relatively thin unit jackets 22 can be made of a material that will not stick to the tight buffer or tight buffer layers 32 on the optical fibers 30, so aramid fibers 14 need not be located between the unit jacket 22 and the tight buffered optical fibers 30. The unit jacket 22 can be a highly filled polymer that can be the same polymer used in the tight buffer or tight buffer layer 32. The unit jacket 22 need not be a load bearing member.

29 Claims, 6 Drawing Sheets

PRIOR ART

HIGH DENSITY FIBER OPTIC PREMISES CABLE WITH EASY OPEN UNITS

FIELD OF THE INVENTION

This invention is related to fiber optic cables used to conduct light for the transmission of voice, video and/or data. More particularly this invention is related to premises cable that can be used in indoor or indoor/outdoor locations. This invention is also related to the use of unitized fiber optic cables containing a plurality of unit cables that permit the segregation and identification of individual optical fibers contained within a high density fiber optic cable.

BACKGROUND OF THE INVENTION

A unitized fiber optic cable is a cable that contains a number of unit or subunit cables. Each of these unit or subunit cables contains multiple optical fibers, typically surrounded by a unit cable jacket. One reason for separating optical fibers into separate units within a unitized cable is to simplify access to individual optical fibers and to aid in identifying individual optical fibers. Higher fiber count premises cables generally comprise unitized cables including individual unit cables. These prior art unit premises cables typically contain six, twelve or more tight buffered optical fibers, having a tight buffer layer or coating forming part of the individual optical fibers, and tensile strength members, such as aramid fibers, within an unit cable jacket. Typically aramid fibers are located between the tight buffered optical fibers and the unit cable jacket, where the aramid fibers will keep the tight buffered optical fibers from adhering or sticking to the unit cable jacket. Sticking could otherwise occur if a unit cable jacket is extruded around tight buffered fibers, containing the same resin that is used in the unit cable jacket. In prior art high fiber count premises cables, the unit jacket as well as the tensile strength members are relied upon to protect the optical fibers from damage. As a result, the thickness of prior art unit jacket is on the order of 0.5 mm and the unit jackets typically contain a polymer, such as polyvinyl chloride having a concentration of between 50% and 75%. Prior art unit cables can also include a glass reinforced plastic (GRP) antibuckling member, typically located at the center of the optical fibers. Prior art unit cables also typically include a ripcord.

In these prior art unitized cables, several unit cables are bundled or stranded together within the outer unitized cable jacket to form a single high fiber count premises cable. This prior art outer unitized cable jacket does not significantly protect constituent optical fibers from tensile or compressive loads. Each individual unit cable instead includes tensile and compressive load bearing members.

Examples of unitized fiber optic cables can be found in U.S. Pat. No. 6,249,628 and in European Patent Application EP 1 041 420 A1. The unitized fiber optic cables disclosed therein each include a plurality of unit or subunit cables in which a layer of dielectric strength members surrounds individual components in each unit cable. These dielectric strength members surround cables that can include at least two optical fibers in turn surrounded by at least one generally round buffer tube. Each optical fiber has a glass core, and inner and outer primary coatings of a thermoplastic that is surrounded by a coloring layer. A tight buffering coating over the coloring layer is not altogether necessary, but may be included in some applications. However a generally round buffer tube with a nominal thickness of 0.170 mm and a maximum wall thickness of 0.240 mm surrounds the two optical fibers. These buffer tubes shown in the prior art are examples of loose buffer tubes which are not bonded to the optical fibers, but which can be extruded around the glass fiber and are employed for fiber protection and segregation. In tight buffered cables, a protective thermoplastic coating is extruded directly on the individual glass fibers.

Figure 1:
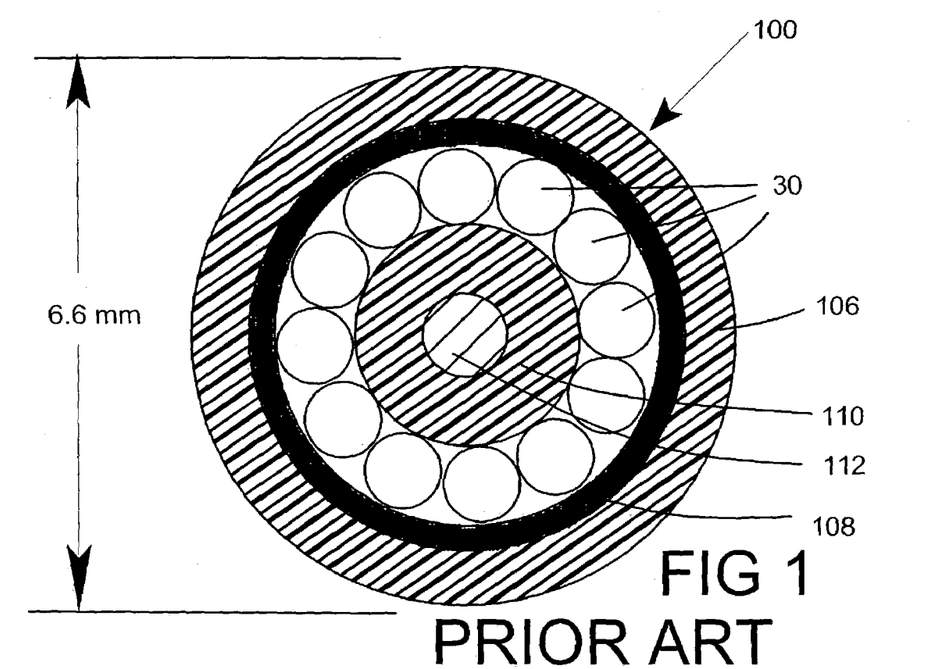
FIG. 1 is a cross-sectional view of a prior art single layer fiber optic unit cable, which can be used with other cables of this type to form a unitized fiber optic cable.
Figure 2:
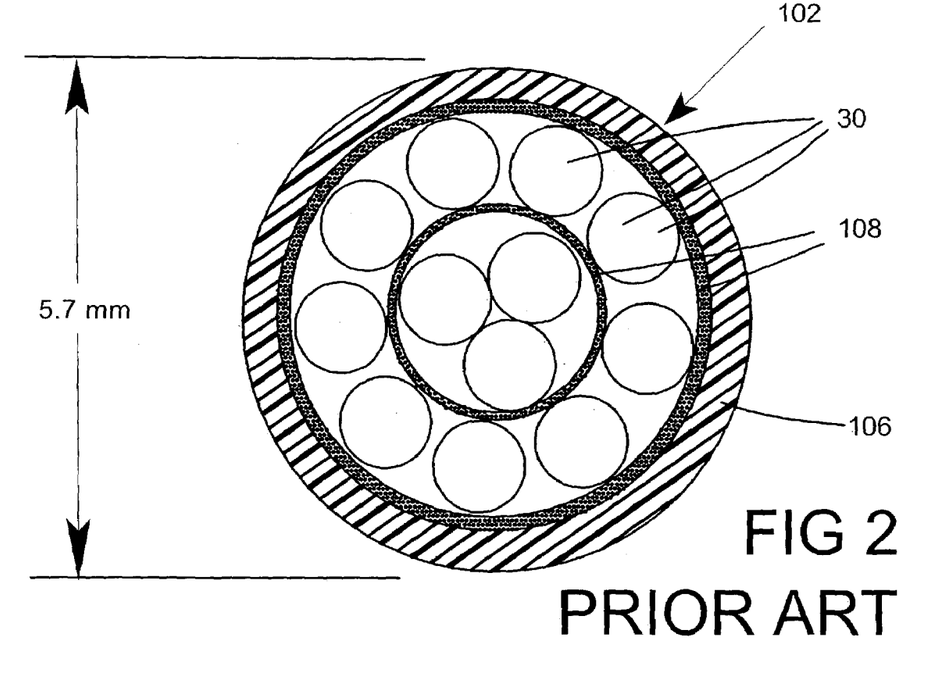
FIG. 2 is a cross-sectional view of a prior art dual layer fiber optic unit cable, which also can be used with other cables of this type to form a unitized fiber optic cable.
Figure 3:
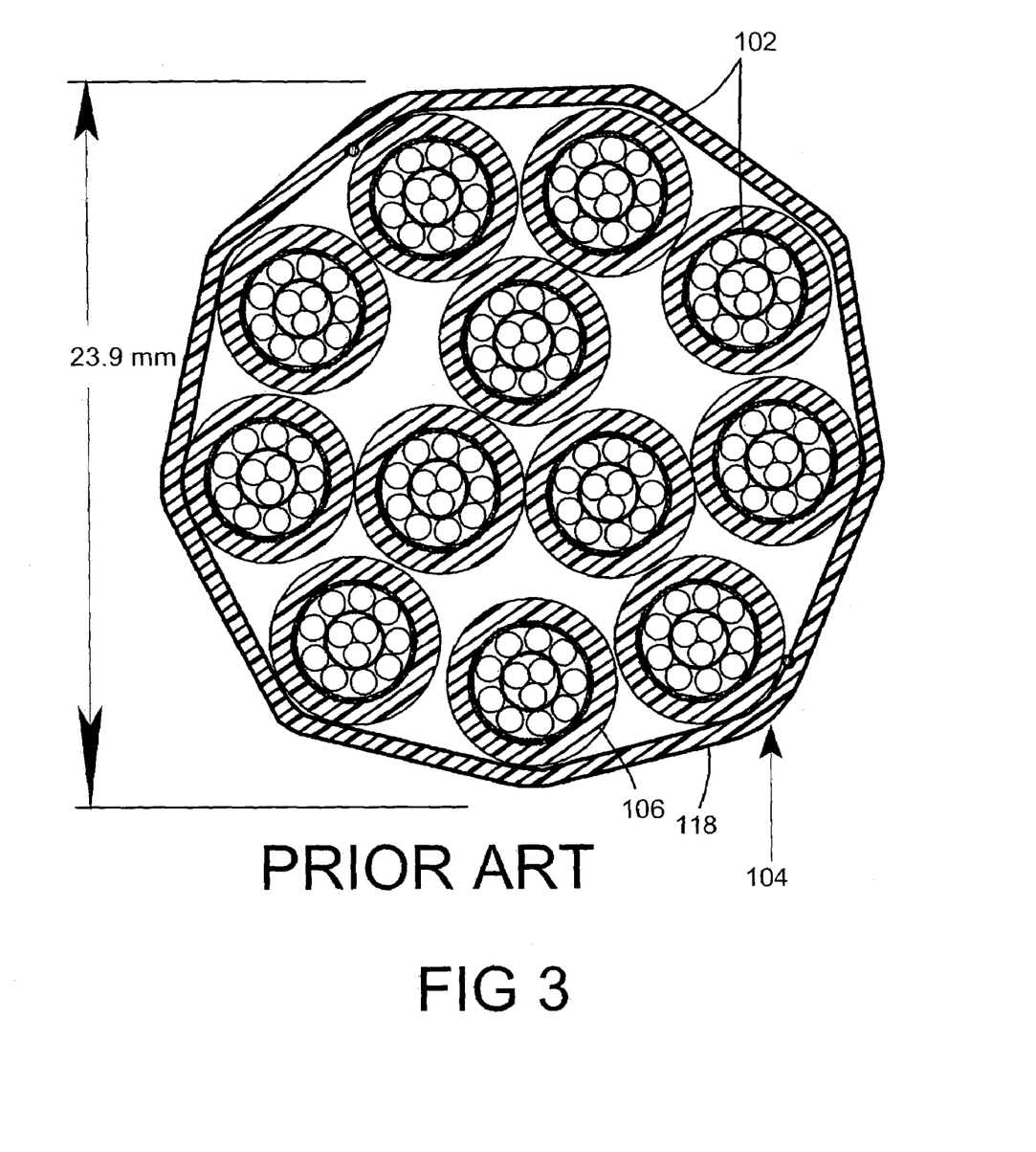
FIG. 3 is a cross-sectional view of a prior art unitized cable that includes twelve dual layer fiber optic unit cables of the type shown in FIG. 2.

FIGS. 1 and 2 also show specific examples of prior art unit cables that can be incorporated into a prior art unitized cable such as that shown in FIG. 3. FIG. 1 shows a prior art single layer unit cable 100 in which a plurality of tight buffered optical fibers 30 surround a glass reinforced plastic (GRP) member 112, which can have a thermoplastic outer layer 110. This central strength member 110 can serve as an antibuckling member. A layer of aramid strength fibers 108 surrounds the optical fibers 30 and separates the optical fibers 30 from an unit jacket 106 that can be extruded from a thermoplastic resin, such as polyvinyl chloride. The unit jacket 106 also functions as a load-bearing member to protect the optical fibers 30 from damage. A ripcord (not shown) can also be embedded between the aramid fibers 108 and the unit jacket 106 and can be used to sever the unit jacket 106 to access the optical fibers 30 when necessary. Typically the prior art single-layer unit cable 100 shown in FIG. 1 has a nominal outer diameter of 6.6 mm and can include twelve individual optical fibers 30.

FIG. 2 shows a prior art dual-layer unit cable 102 in which twelve optical fibers 30 are arrayed in two generally concentric layers. Aramid yarns 108 separate the two concentric layers and surround the outer layer. Aramid yarns 108 can also be positioned at the center of the optical fiber array. As with the prior art single layer unit 100, a unit jacket 106, formed primarily of a material such as polylvinyl chloride, surrounds the outer aramid layer 108. This prior art dual-layer unit cable 102 can have an outer diameter of 5.7 mm. In both the single layer and dual layer unit cables, the unit jacket 106 can have a thickness of approximately 0.5 mm and serves not only to segregate optical fibers 30 into identifiable unit cables, but also provides physical protection for the optical fibers.

FIG. 3 is an example of a prior art unitized cable 104 including twelve of the dual-layer unit cables 102 shown in FIG. 2. The unit cables 102 are arrayed in two layers and surrounded by an outer cable jacket 118. The nominal diameter of this prior art unitized cable is 23.9 mm. Since this unitized cable 104 includes the smaller dual layer unit cables of FIG. 2, a unitized cable containing prior art single layer unit cables of the type shown in FIG. 1 would be expected to have a larger outer diameter.

The outer diameter of these prior art premises cables is significant because space is often limited in locations, such as risers and trays in which multiple unitized cables are to be located or at entrances and exits to wiring closets and other similar locations. Therefore a reduction in the diameter of unitized cables, without compromising their physical integrity is desirable. Use of the instant invention results in unit cables and unitized cables having a smaller nominal outside diameter and potentially a smaller size in actual practice.

SUMMARY OF THE INVENTION

A unitized fiber optic cable according to this invention includes a plurality of unit cables. Each unit cable contains a plurality of tight buffered optical fibers. Each tight buffered optical fiber has tight buffer or tight buffer layer surrounding a glass fiber, and an extruded unit jacket enclosing the tight buffered optical fibers. The unit jacket is in contact with at least some of the tight buffered optical fibers and is formed of material having a composition sufficiently different from the tight buffer or tight buffer layer so as not to adhere to individual tight buffered optical fibers. The plurality of unit cables are enclosed by a cable jacket and strength members are located between the unit cables and the cable jacket.

Each unit cable in the unitized cable will include optical fibers surrounded by a unit jacket comprising a thin polymeric non-load bearing tube. The unit jacket is intended to be weak and easily severed and is not intended to provide physical protection for the tight buffered optical fibers surrounded by the unit jacket. The unit cables are surrounded by a cable jacket. In one embodiment, strength members are located only between the unit cables and the cable jacket.

This invention results in a high density fiber optic cable including a plurality of unit cables, each unit cable including a plurality of optical fibers. The plurality of optical fibers can be surrounded by a thin non-load-bearing unit jacket less resistant to mechanical stresses than the tight buffer or tight buffer outer layer of each optical fiber. The high density fiber optic cable also includes an outer cable jacket and tensile strength members located between the unit cables and the outer cable jacket so that the unit cables can be more tightly packed to form a relatively dense fiber optic cable.

BRIEF DESCRIPTION OF THE INVENTION

DETAILED DESCRIPTION OF THE PREFERRED EMBODIMENTS

The unitized fiber optic cable 10 includes a plurality of unit cables 20, each of which can have a smaller outside diameter than the unit cable configurations 100, 102 shown in FIGS. 1 and 2. Therefore the unitized cable 10, shown in FIG. 5, can also have a smaller outside diameter than the unitized cable 104, shown in FIG. 3. Representative dimensions for the outside diameter of each of the cable configurations, shown in FIGS. 1–5 are shown for purposes of comparison. The dimensions indicated for each of these cables are intended to be nominal dimensions only and do not represent limiting dimensional constraints for any of the representative configurations of the invention described herein or of the representative prior art configurations, also described herein. However, the dimensions shown for these five configurations are indicative of the size reduction that is possible by employing the invention described herein. Comparison of FIGS. 3 and 5 shows that a reduction in the outside diameter from 23.9 mm to 18.5 mm can be achieved for a unitized cable 10 containing a total of one hundred forty-four tightly buffered optical fibers 30 divided into twelve unit cables 20.

Figure 9:
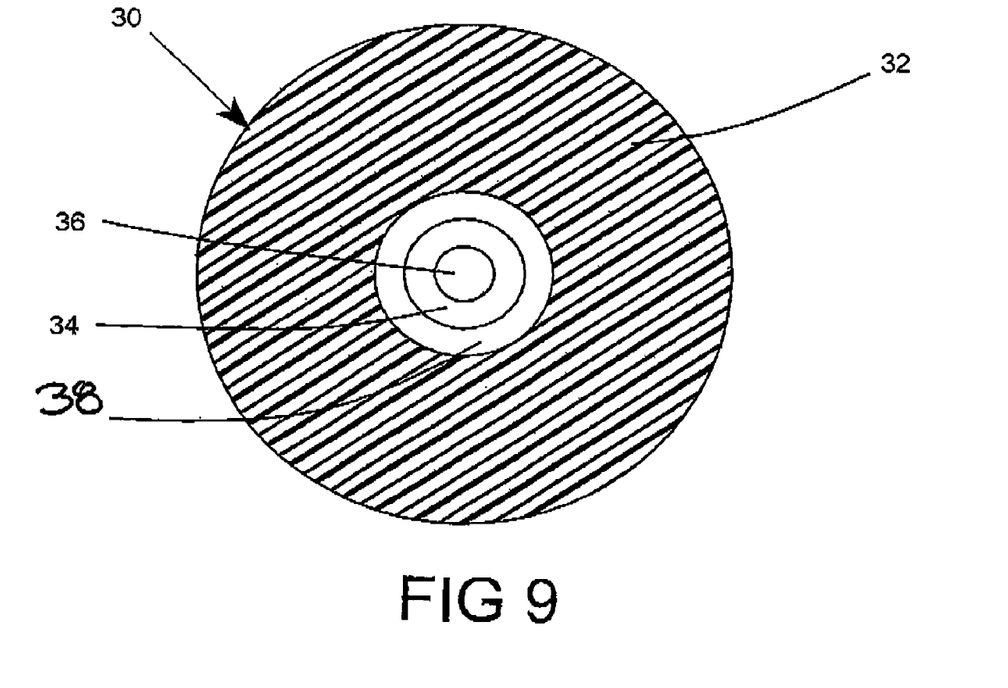
FIG. 9 is a cross-sectional view, greatly exaggerated, of a tight buffered optical fiber of the type used in the unit cables discussed herein.

The tightly buffered optical fibers 30 with which this invention is employed are of conventional construction as shown in FIG. 9. Each glass optical fiber 30 has a central core 36 surrounded by cladding 34 for single mode or multimode optical transmission. A primary protective acrylate coating 38 surrounds the cladding 34 to prevent abrasion of the cladding 34. A tight buffer or layer 32 forms the outer layer of the optical fiber 30. This tight buffer 32 consists of a protective material extruded directly onto the acrylate covered inner glass fiber to protect the glass fiber from the environment and for mechanical and physical stresses. Tight buffer 32 will typically be formed of a thermoplastic material, such as polyvinyl chloride which can be colored so that individual optical fibers can be identified within a unit cable by their unique color. An optical fiber of this type is referred to as a tight buffered fiber as opposed to a loose tube optical fiber in which the glass fiber is positioned within a separate cylindrical member or loose tube. In the representative embodiment discussed herein, the tight buffer 32 includes a polyvinyl chloride resin, but other materials can be used. Example of resins in addition to polyvinyl chloride that can be used to form a tight buffer layer also include, but are not limited to polyethylene, nylon, UV cured acrylates, fluoroplymers, polyvinyladelene flouride, polypropylene and polyesters.

Tight buffered optical fibers 30 are situated in unit cables 20 to simplify identification of individual cables in high count cables of the type commonly employed as premises cables. The representative embodiment of unit cable 20 depicted herein includes twelve tight buffered optical fibers 30 contained within a unit jacket 22. This unit jacket 22 is a relatively thin member that contains a thermoplastic resin. In the preferred embodiment, the unit jacket includes a polyvinyl chloride resin, plasticizers, additives and fillers, such as talc, chalk, fuller's earth or other inert materials. In the preferred embodiment, the concentration of the polyvinyl resin is approximately 25%, although concentrations of from 10% to 35% would be suitable for some applications. This polyvinyl chloride concentration compares with a concentration of from 50% to 75% for the prior art unit cable jackets of the embodiments of FIGS. 1 and 2. The relatively higher concentration in the prior art cables is believed to be due to reliance upon the unit jackets to protect optical fibers from damage. In addition to the higher resin concentration, the prior art unit cables also include strength members, such as an antibuckling central GRP strength member 110 in the single layer cable of FIG. 1 and tensile strength members, such as aramid fibers 108 in both the single and dual layer unit cables 100, 102. The prior art unit jackets 106 are also approximately 0.5 mm thick, while the unit jacket 22 of the preferred embodiment need only be approximately 0.1 mm to 0.3 mm thick. The reduction in the size of the unit cable jacket and the resin concentration means that far less thermoplastic resin is used in the instant invention. Since the resin is one of the more expensive components, a significant cost reduction can be achieved.

The unit jacket 22 employed in this invention comprises a relatively thin polymeric, non-load-bearing, flexible cylindrical member or tube that is not intended to resist mechanical or physical stresses or forces applied to the optical fibers 30 within the unit cable 20. Indeed the unit jacket 22 will be less resistant to mechanical stresses than the tight buffer outer layer 32. The unit jacket 22 is intended to be relatively weak so that it can be easily severed In this invention the unit cable jacket 22 is not intended to perform any significant function other than segregating and identifying a portion of the optical fibers 30 contained within a high count, high density, unitized fiber optic cable 10. It has been found that adequate physical protection can instead be provided by strength members 14, such as aramid fibers, located within the outer cable jacket 12 of the unitized cable 10. In the preferred embodiment, the strength members 14 are positioned along the interior of the unitized cable jacket 12 and between the unit cables 20 and the outer unitized cable jacket 22. In the preferred embodiment, all of the aramid fibers are removed from the unit cables 20 and located only between the unit cables 20 and the cable jacket 12. Adequate physical protection can be achieved with the present invention by using fewer aramid fibers or other strength members than are would be employed if the strength members are part of each prior art unit cable 100, 102. Elimination of these strength members not only allows reduction in the outer dimension of the unitized cable 10, but also reduces cost by eliminating components.

The unit cables 20 are fabricated by extruding the unit cable jacket 22 over tight buffered optical fibers 30. The thermoplastic resin used in the unit cable jacket 22 must of course be heated to flow during this extrusion process. However, the concentration of the thermoplastic resin forming the unit jacket 22 is relatively small because of the addition of fillers. There will therefore, be less tendency for the heated resin to adhere to the tight buffer or layer 32 surrounding each optical fiber, even if as in the present embodiment, polyvinyl chloride is present in both the buffer layer 32 and the extruded unit jacket 22. Example of resins in addition to polyvinyl chloride that can be used to form unit jacket 22 also include, but are not limited to polyethylene, nylon, UV cured acrylates, fluoroplymers, polyvinyladelene flouride, polypropylene and polyesters. In many instances the same resin will be used in both the unit jacket 22 and the tight buffer 32, but the resin used in the unit jacket 22 can be different from that used in the unit jacket 22. Whether or not the same resin is used in both the unit jacket 22 or the tight buffer 32, it is preferred that more fillers are used in the unit jacket 22 than in the tight buffer 32, both to weaken the unit jacket 32 and to keep the unit jacket 22 from sticking to the tight buffered fibers 30.

Even if different resins are used in the unit jacket 22 and in the buffer layer 32, there will be some tendency for the resins to adhere if the melting points of the two resins are close. The addition of fillers to the unit jacket 22 will, however, reduce this tendency of the polymeric resins to adhere or stick to each other once the resin has cooled. The addition of fillers to the resin forming the unit jacket 22 will also reduce the tensile and shear strength of the unit jacket 22. In the present invention, the individual optical fibers 30 can be pulled to sever the unit jacket 22 so that the optical fibers 30 themselves can act as a ripcord. Elimination of a ripcord from the unit cables 20 will allow a further reduction in the cross sectional area and outside diameter of the unit cables resulting in denser packaging. Unit cables 20 will therefore be relatively easy to open.

Figure 6:
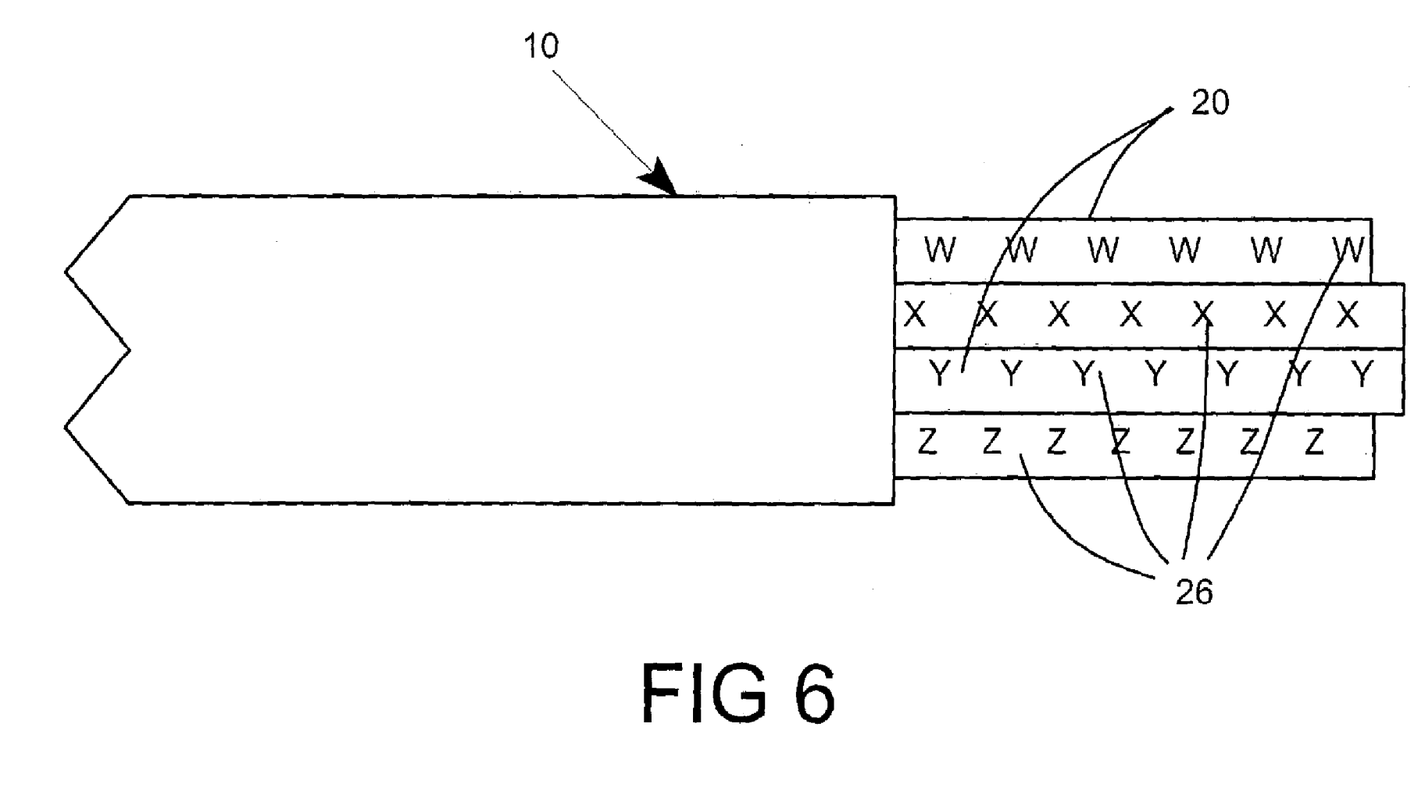
FIG. 6 is a side view of a unitized fiber optic cable showing identification marks on unit cable jackets of each separate fiber optic unit cable of the type shown in FIG. 5.

A primary function of each unit cable 20 is identification. As demonstrated in FIG. 6, unique identification markings 26 can be printed or otherwise placed on the unit jacket exterior of each unit cable 20. Each optical fiber 30 in the unitized cable 10 can thus be identified by first locating the correct unit cable 20 and then relying upon the color coating on the individual fibers 30 within each unit cable 20. The markings 26 on the unit cable jacket 22 will be longitudinally repetitive so that a given unit cable 20 can be uniquely identified at two locations some distance from each other. Alternatively, color coded unit jackets or some combination of color coding and printing can used to identify the unit cables 20. Common methods of printing include ink jet, print wheels and laser printing. In some cables the unit jackets 22 could be color coded to indicate fiber type and then printed with a unit number or code.

The outer cable jacket 12 is finally extruded around the plurality of unit cables 20 forming the unitized cable 10. To control the attenuation of the optical fibers 30, the tight buffered fibers are stranded within the unit cables 20 before the cable jacket 22 is extruded over the fibers. Optical fibers 30 within each unit cable 20 can be helically stranded, and the unit cables 20 can be planetary stranded to form the unitized cable 10. The fibers 30 can also be run parallel inside the unit cables 20 and then the units can be rigid frame stranded to form the unitized cable 10. The fibers can also be SZ stranded within the unit cables. The units may also be SZ stranded within the unitized cables.

Figure 4:
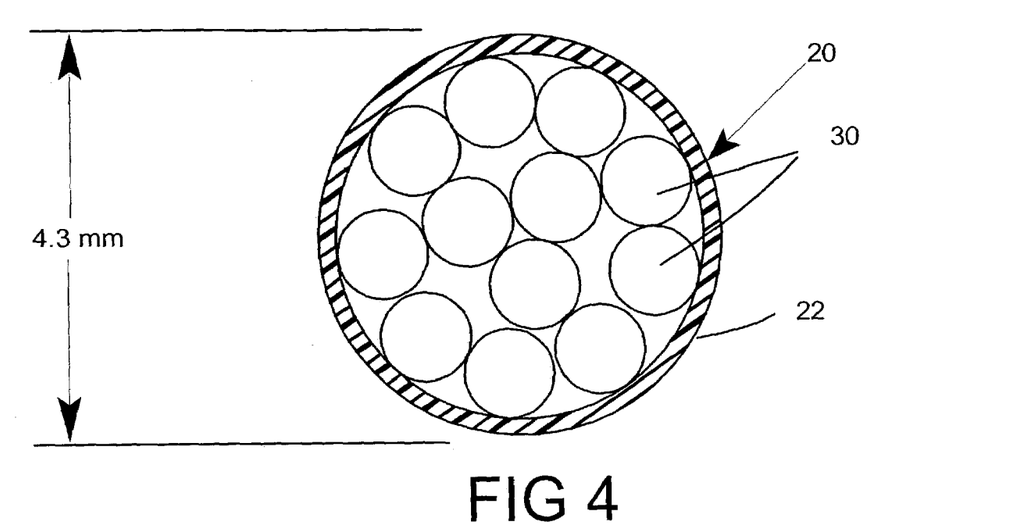
FIG. 4 is a cross-sectional view of a fiber optic unit cable according to this invention, which includes twelve individual optical fibers.
Figure 5:
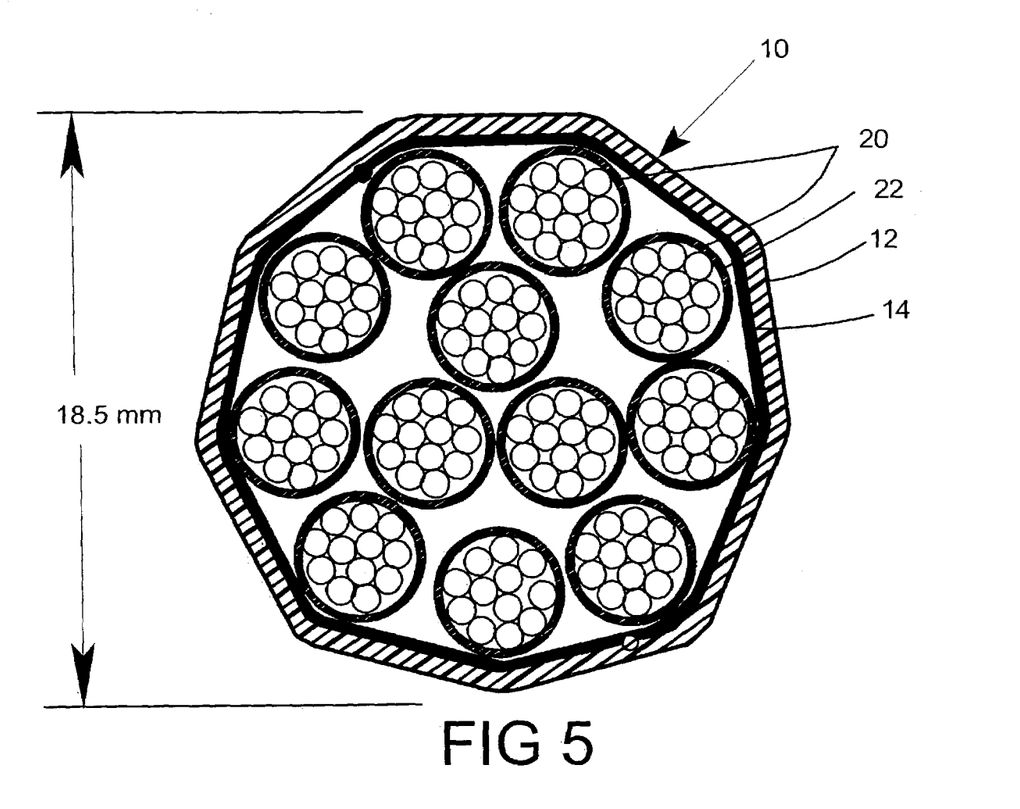
FIG. 5 is a cross-sectional view of a fiber optic unitized cable according to this invention, which uses twelve fiber optic unit cables of the type shown in FIG. 4.
Figure 7:
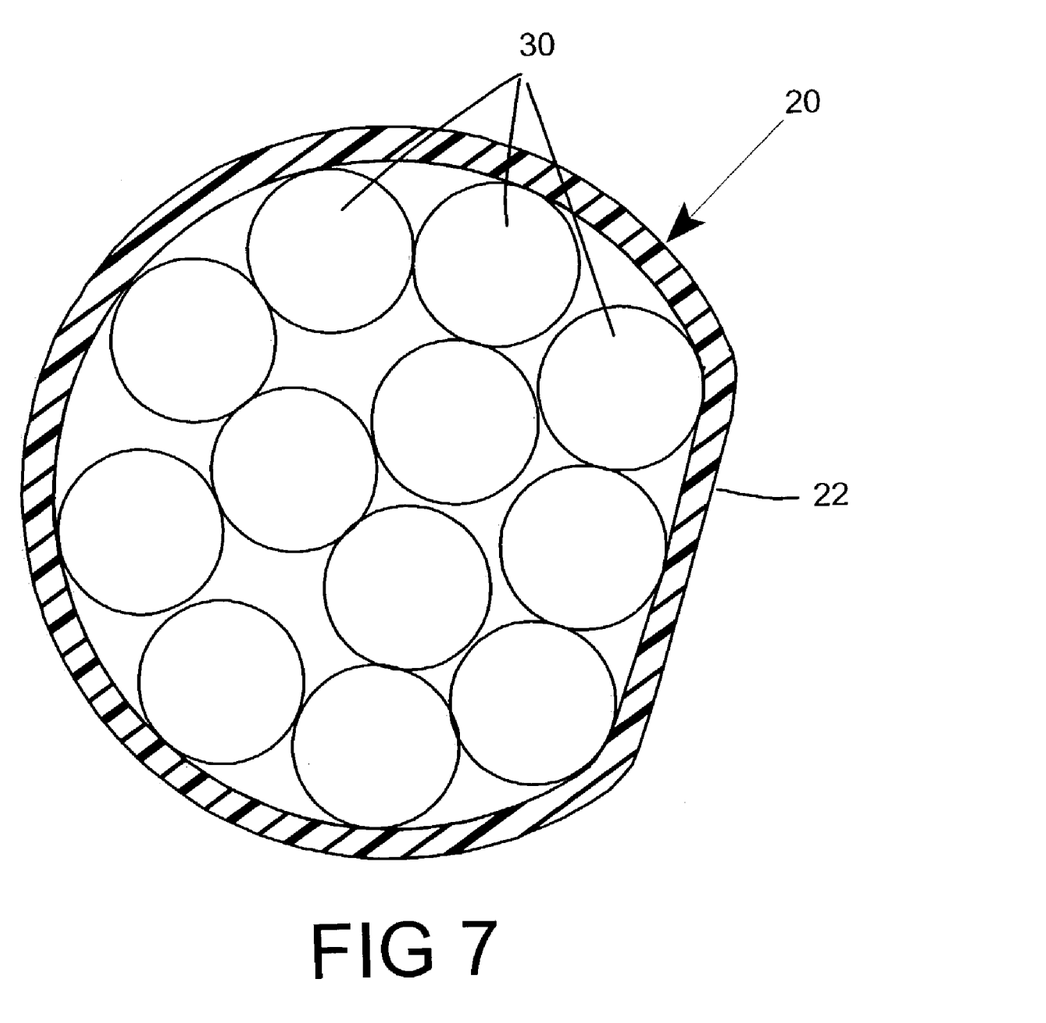
FIG. 7 is a cross-sectional view of a fiber optic unit cable similar to that shown in FIG. 4, but showing how the individual optical fibers can rearrange themselves in actual installations.

FIG. 4 shows a unit cable 20 having a circular cross section. However, because the unit jacket 22 is relatively thin and is not relied upon to provide physical protection, the optical fibers 30 can be allowed to shift laterally relative to each other. FIG. 7 shows one example of a unit cable 20 in which the optical fibers have been randomly rearranged to form an even tighter bundle than circular cross section shown in FIG. 4.

Figure 8:
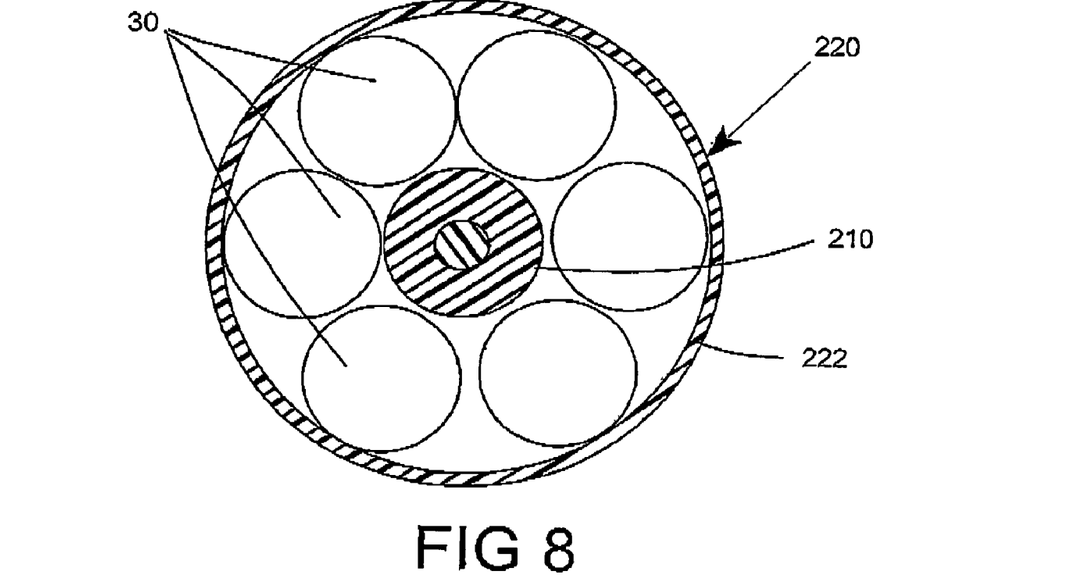
FIG. 8 is a cross-sectional view of an alternate embodiment of a unit cable that contains six tight buffered optical fibers.

The unitized cables shown in FIGS. 4–5 and 7 each include twelve unit cables, which in turn contain twelve optical fibers. However, this invention is not limited to that particular configuration. FIG. 8 shows a unit cable 220. Each unit cable 220 can include six tight buffered fibers 30 of the same type as those shown in FIGS. 1–5. These six tight buffered optical fibers 30 surround a central GRP strength member 210, and the six tight buffered optical fibers 30 are in turn surrounded by a unit cable jacket 222, which has substantially the same configuration as unit cable jacket 22, employed in FIGS. 1–5. Unit cable 220 can then be situated in a unitized fiber optic cable with other similar unit cables 220. The embodiment of FIG. 8 is simply one of the other cable configurations having a different optical fiber count which can be used in a high density unitized cable also having a cable count different from the embodiments of FIGS. 4 and 5.

Numerous other modifications would be apparent to one of ordinary skill in the art. In addition to the aramid fibers 14 used in the preferred embodiment of the unitized cable 10, a glass reinforced plastic (GRP) or steel central member can be added to improve low temperature performance. The GRP or steel member could also be located in the center of the cable or located between the outer cable jacket 12 and the aramid fibers 14. Fiberglass strength members could also be used instead of aramid fibers. A GRP or steel strength member may be sized such as to provide the required tensile strength of the cable and aramid or fiberglass yarns could be eliminated.

Internal strength members, such as aramid yarns or GRP rods could also be added to the individual unit cables. Although the addition of strength members inside the unit cables or between the unit cables and the outer cable jacket 12 will tend to increase the size of the cable, a similar size advantage will still be achieved over conventional unitized cables containing the same strength members.

Although the preferred embodiment employs a polyvinyl chloride resin in the cable jackets, the invention is not limited to that material. As previously discussed, other resins, including polyester resins, could be employed. The cable materials could also be modified to achieve riser plenum or LSZH flame ratings. The cable could also be made with an UV and weather resistant outer jacket for outdoor use. The cable could be armored to provide additional protection to the fibers. Water swelling thread, tapes or powders could be added inside and between the unit cables to make the cable resistant to water penetration. Although primarily intended for indoor use, the cable could be modified by one of ordinary skill in the art for indoor-outdoor use. The unit cable could even be made of an edible material, for example plasticized polysaccharides, for use as food in the event of an emergency, such as an earthquake, which could trap occupants within a building.

Removing the aramid from the unit cables and placing these strength members between the unit cables and the outer unitized cable jacket results in a number of advantages over prior art cable in addition to the reduction in the size of the cable. This arrangement improves the distribution of stress when the cable is under a tensile load. In the prior art, the aramid in the unit cables acts as a separation layer to prevent the fibers from sticking to the unit jacket. Highly filled polymers, such as the PVC used in the preferred embodiment, will not stick to the PVC tight buffered optical fibers, and the aramid can be removed from the unit cables. Removing the aramid from the unit cables reduces the total quantity of aramid, therefore reducing cable cost. The smaller cable will use less plastic, which will also reduce cost. The smaller units will also be more flexible and easier to install. The low shear modulus of the unit jackets material will in turn allow the tight buffered optical fibers to be used as ripcords for the unit cables providing easy access to the optical fibers. The aramid arrayed about the unit cables instead of within the unit cables permits easier access to the optical fibers than when the aramid is arrayed about the optical fibers within the units. The smaller size in turn improves handling and cable routing during installation. These and other advantages are achieved by the invention recited in the following claims.

We claim:

1. A unitized fiber optic cable including a plurality of unit cables, each unit cable comprising a plurality of tight buffered optical fibers, each tight buffered optical fiber having a tight buffer layer surrounding a glass fiber, and an extruded unit jacket enclosing the tight buffered optical fibers, the unit jacket being in contact with at least some of the tight buffered optical fibers and being formed of a filled polymer material having a composition sufficiently different from the tight buffer layer so as not to adhere to individual tight buffered optical fibers, wherein the plurality of unit cables are enclosed by a cable jacket and strength members are located between the unit cables and the cable jacket.

2. The unitized fiber optic cable of claim 1 wherein the strength members are located only between the unit cables and the cable jacket.

3. The unitized fiber optic cable of claim 1 wherein the optical fibers are stranded.

4. The unitized fiber optic cable of claim 1 wherein the strength members comprise aramid fibers on the inside of the cable jacket, the aramid fibers surrounding the unit cables.

5. The unitized fiber optic cable of claim 1 wherein the unit cables are stranded.

6. The unitized fiber optic cable of claim 1 wherein each tight buffered optical fiber has an tight buffer layer, the tight buffer layer including a resin, the same resin being included in the unit jacket, the unit jacket also including sufficient filler material such that the unit jacket will not adhere to the tight buffer layer.

7. The unitized fiber optic cable of claim 1 wherein the unit jacket is formed of a filled polyvinyl chloride resin.

8. The unitized fiber optic cable of claim 7 wherein the concentration of polyvinyl chloride resin in the unit jacket is between 10 and 35%.

9. The unitized fiber optic cable of claim 8 wherein the concentration of polyvinyl chloride resin in the unit jacket is approximately 25%.

10. The unitized fiber optic cable of claim 1 wherein unit jacket has a thickness of approximately 0.1 mm to 0.3 mm.

11. The unitized fiber optic cable of claim 1 wherein shear strength of the unit jacket is sufficiently low such that the optical fibers will sever the unit jacket and can be used as a ripcord.

12. The unitized fiber optic cable of claim 1 wherein the unit jacket includes visible identification markings to distinguish one unit cable from other unit cables in the same unitized cable.

13. The unitized fiber optic cable of claim 1 wherein each unit cable includes more than two tight buffered optical fibers.

14. A fiber optic cable including a plurality of unit cables, each unit cable including a plurality of optical fibers surrounded by a unit jacket comprising a thin polymeric non-load bearing tube, the plurality of unit cables being surrounded by a cable jacket, the fiber optic cable including strength members located only between the unit cables and the cable jacket.

15. The fiber optic cable of claim 14 wherein each unit jacket bears individual identification marks to distinguish each unit jacket from the other unit jackets in the fiber optic cable.

16. The fiber optic cable of claim 14 wherein each optical fiber comprises a tight buffered optical fiber.

17. The fiber optic cable of claim 14 wherein each tight buffered optical fiber has an tight buffer layer, the tight buffer layer including a resin, the same resin being included in the unit jacket, the unit jacket also including sufficient filler material such that the unit jacket will not adhere to the tight buffer layer.

18. The fiber optic cable of claim 17 wherein the resin comprises polyvinyl chloride.

19. The fiber optic cable of claim 18 wherein the concentration of polyvinyl chloride in the unit jacket is between 10% and 35%.

20. The fiber optic cable of claim 19 wherein the concentration of polyvinyl chloride in the unit jacket is approximately 25%.

21. The fiber optic cable of claim 14 wherein each unit cable includes more than two tight buffered optical fibers.

22. A high density fiber optic cable including a plurality of unit cables, each unit cable including a plurality of optical fibers, each with a tight buffered outer layer, the plurality of optical fibers being surrounded by a thin non-load-bearing unit jacket less resistant to mechanical stresses than the tight buffered outer layer of each optical fiber, the high density fiber optic cable also including an outer cable jacket and tensile strength members located between the unit cables and the outer cable jacket so that the unit cables can be more tightly packed to form a relatively dense fiber optic cable.

23. The high density fiber optic cable of claim 22 wherein the unit jackets of different unit cables within the high density fiber optic cable include identification markings detectable along the length of the unit cables to distinguish each unit cable for other unit cables in the high density fiber optic cable.

24. The high density fiber optic cable of claim 22 wherein the unit cable jackets are formed of a material having a composition sufficiently different from the tight buffer layer so as not to adhere to the tight buffer layer of individual tight buffered optical fibers.

25. The high density fiber optic cable of claim 24 wherein the unit cable jackets are extruded around the tight buffered optical fibers.

26. The high density fiber optic cable of claim 25 wherein the unit cable jackets and the outer tight buffer layer of the tight buffered optical fibers include the same resin, the unit cable jackets including more filler materials than the tight buffer optical fibers so that the concentration of the resin is less in the unit cable jackets than in the tight buffer to reduce any tendency of the unit cable jackets to adhere to the outer tight buffer layer of optical fibers during extrusion.

27. The high density fiber optic cable of claim 22 wherein the tensile strength members are located only between the unit cables and the outer cable jacket.

28. The high density fiber optic cable of claim 22 wherein the tight buffered optical fibers within each unit cable are free to shift laterally relative to each other, subject only to the lateral constraint of the unit jacket surrounding tight buffered optical fibers in the same unit cable and of other unit cables in the high density fiber optic cables.

29. The high density fiber optic cable of claim 22 wherein each unit cable includes more than two tight buffered optical fibers.

* * * * *